United States Patent
Kessler et al.

[15] 3,659,911
[45] May 2, 1972

[54] HYDROSTATIC PLAIN BEARINGS

[72] Inventors: Franz Kessler; Karl Brand, both of Ebern, Germany

[73] Assignee: Kugelfischer George Schafer & Co., Schweinfurt, Germany

[22] Filed: July 6, 1970

[21] Appl. No.: 52,666

[30] Foreign Application Priority Data

July 7, 1969 Germany........................P 19 34 361.4

[52] U.S. Cl............................................308/122
[51] Int. Cl..............................................F16c 17/16
[58] Field of Search............................308/5, 122, 9

[56] References Cited

UNITED STATES PATENTS 2,389,687  11/1945  Rickenmann.............................308/5

FOREIGN PATENTS OR APPLICATIONS 332,253  10/1958  Switzerland..............................308/5

Primary Examiner—Martin P. Schwadron
Assistant Examiner—Frank Susko
Attorney—Stevens, Davis, Miller & Mosher

[57] ABSTRACT

An arrangement of plain hydrostatic bearings for rotatably mounting a spindle in which the spindle is provided with a pair of tapered bearing surfaces symmetric to a plane perpendicular to the spindle's axis. Front and rear bearing boxes, each formed by several segments having lubricating oil pockets, are formed about the tapered bearing surfaces with the front box being rotatably and axially fixed and the rear box being rotatably fixed but axially movable to compensate for heat expansion.

3 Claims, 4 Drawing Figures

INVENTORS
FRANZ KESSLER
KARL BRAND

HYDROSTATIC PLAIN BEARINGS

The present invention relates to a means for mounting a spindle by hydrostatic plain bearings, intended particularly for the work spindles of machine tools, which consists of tapered supporting slide surfaces formed on the spindle by which it is radially and axially supported in corresponding conical nonrotating bearing bushings provided with lubricating oil pockets.

The use of hydrostatic plain bearings in supporting work spindles of cutting machine tools and the like is becoming more and more popular as a result of the high overall stiffness of the supported system which can be obtained, the high range of sliding speed and the high degree of trueness of running of the supported spindle.

There are already known hydrostatic plain bearings for supporting spindles which consist of full-shell conical bearing bushings screwed onto the spindle and resting in corresponding conical bearing boxes which are fixed against rotation. There are lubricating oil pockets in these boxes into which lubricating oil is forced to then emerge from the lubricating oil pockets through the gap between the bearing slide surfaces. Both the front bearing, i.e., the one which lies at the end of the spindle upon which the forces occurring during the cutting work act, as well as the opposite or rear bearing, are developed as fixed bearings in the known spindle mountings. There is a spindle bushing in the bearing box located opposite each of the bearings with the bushings being tapered conically towards each other, the bearing box correspondingly narrowing or broadening in a tapered shape towards its center.

If the distance between bearings increases, due to thermal expansion of the spindle caused by operation, then a change is produced in the width of the lubricating gaps in the known spindle mounting. The lubricating slot at the inner conical bearing slide surfaces, seen in axial direction, becomes so narrow that there is the danger of metallic pockets. If contact, while the outer conical bearing lubricating slot becomes too wide to be effective. This change in the width of the lubricating slot results in a change of the pressure in the lubricating oil pockets, which makes it difficult, if not impossible, to maintain the required oil pressure in the pockets for carrying the spindle. Furthermore, in the known spindle mounting the unipartite bearing boxes are replaced only by cumbersome removal of the bearing bushings which are screwed onto the spindle. If the front end of the spindle is provided with a flange cut thereon, then the spindle part located between the bearings cannot be increased in diameter, since in such case the unipartite bearing bushings and the bearing box could not be assembled.

These disadvantages are eliminated in a hydrostatic spindle mounting having tapered bearing slide surfaces in that the spindle is formed with two tapered bearing slide surfaces symmetrical to a plane perpendicular to the axis of the spindle and that the bearing boxes are composed of at least three segments of the same conicity, each provided with one lubricating oil pocket. The segments are clamped firmly in position in the housing for the front spindle bearing. For a rear spindle bearing, the segments are brought by axial displacement over a clamping device, having an initial stress, supported on the housing onto the corresponding tapered bearing slide surface of the spindle.

In accordance with the present invention, the spindle to be supported has a tapered bearing slide surface on both its front and rear ends with these surfaces resting on corresponding bearing boxes. In this connection the bearing box, composed of several segments, of the front spindle bearing is firmly clamped and axially fixed in the housing in the same manner as in the case of a fixed bearing, while the bearing box of the rear spindle bearing, which box also consists of a plurality of segments, is displaceable axially. In accordance with the present invention there is furthermore provided a clamping device having an initial stress which rests on the housing of the spindle mounting and which urges the bearing box segments of the rear spindle bearing axially against the corresponding conical bearing slide surface of the spindle. A lubricating gap is formed between the bearing box elements provided with pockets and supplied with oil under pressure and the bearing slide surfaces of the spindle to prevent metallic contact between the parts which slide on each other.

The spindle mounting of the present invention has the advantage that the required widths of the lubricating gap are maintained constant by an automatic axial readjustment of the bearing box segments of the rear spindle bearing when thermal expansion of the spindle resulting from operation occurs. The width of the lubricating gap of the rear spindle bearing is not increased despite any increase in length of the spindle. This is important since the amount of oil under pressure required to maintain the lubricating oil pocket pressure would increase by the third power as the width of the slot increases in the known hydrostatic bearings with tapered slide surfaces. In contradistinction to this, the spindle mounting of the present invention has constant lubricating slot width so that the feed power for the pressure oil can remain constant, and this leads to a simplification of the unit for the supplying of oil under pressure.

In accordance with the present invention, the automatic axial readjustment of the bearing box segments in order to maintain a constant lubricating slot width is produced by an axially acting clamping device having an initial stress which produces a predetermined axial force the amount of which depends on the required hydrostatic pressure in the lubricating oil pockets. If this clamping device consists of a mechanical spring, then the required spring hardness depends on the pressure in the lubricating oil pockets. By a change in the initial stress of the clamping device, the lubricating slot width between the surfaces of the spindle mounting can be optimally adapted to the specific operating conditions.

In the case of axially displaceable bearings in accordance with the present invention, the following relationship can be set up for the optimum adaptation of the lubricating slot width after determination of the bearing stiffness which is dependent in particular also on the pocket pressure and after the establishing of the speed of sliding.

$$h_{opt} = \sqrt[4]{\frac{4 \cdot \eta^2 \cdot v^2 \cdot 1 \cdot \epsilon_p \cdot F_R}{P_P \cdot P_T \cdot b}}$$

Herein:
$\eta$ = viscosity of the oil
$v$ = speed of sliding
$l$ = flow-out length
$b$ = flow-out width
$P_p$ = pump pressure
$P_T$ = pocket pressure
$F_R$ = sum of the rib surfaces
$\epsilon_p$ = pump efficiency It will be noted from the above relationship that the optimum slot width for given bearing dimensions, as well as a given viscosity of the oil and given pump and pocket pressures, depends very substantially on the speed of sliding.

The conical bearing boxes of the inventive spindle mounting are not made of one piece but are composed of at least three segments. The spindle part between the two bearings is thus not limited in diameter as in the case of the known arrangements. These bearing box segments can be used even in the case of spindles which are of considerably increased diameter between the bearing places, as well as in the case of spindles the front end of which have a flange cut thereon. An increase in the diameter of the spindle leads to an increase in the moment of inertia of the spindle and thus in the flexural stiffness of the spindle. A spindle should be sufficiently rigid that it is only insignificantly deformed by the forces which occur. The fact that a thickening of the spindle between the supporting places increases the stiffness can be noted from the well-known Schenk formula:

$$R_s = 530 \, (D^4 - d^4) / l^3$$

in which $R_s$ is the degree of rigidity, $D$ the outside diameter of the spindle between the bearings, $d$ the diameter of the spindle bore, and $l$ the distance between bearings. In the spindle mounting of the invention, in which the spindle is not limited in its moment of inertia by the mounting of the bearing, there is no danger therefore, upon the action of high radial loads, of metallic contact between a bent spindle and the edges of the bearing box.

The bearing slide surfaces of the spindle preferably taper towards each other, with each surface having the same taper angle. In accordance with another feature of the inventive mounting, a ring which is axially displaceable in the bearing housing can be arranged between the axially displaceable bearing box segments of the rear spindle bearing and the clamping device.

The clamping device for the bearing box segments of the rear spindle bearing can consist of a plate spring, or a plurality of spiral springs which are distributed over the periphery of a grooved intermediate ring, or finally a hydraulically actuated ring-piston unit. An adjusting sleeve provided with external thread which rests on a fixed threaded ring of the housing and presses against the different spring elements can be provided for adjusting and changing of the initial tension of the clamping device.

The means for accomplishing the foregoing objects and other advantages, which will be apparent to those skilled in the art, are set forth in the following specification and claims and are illustrated in the accompanying drawings dealing with a basic embodiment of the present invention. Reference is made now to the drawings in which:

Figure 1:
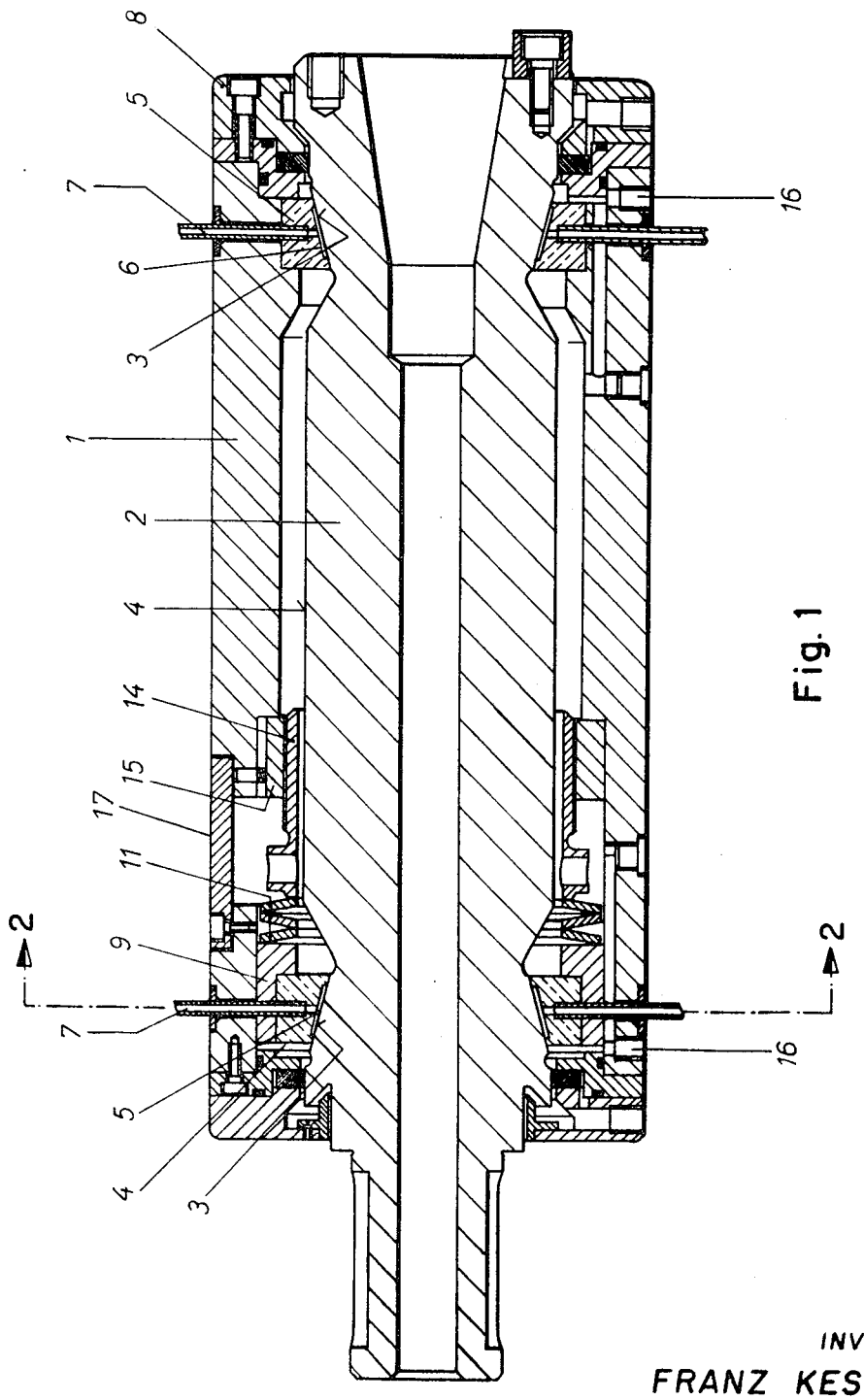
FIG. 1 is an axial section through a spindle mounting in accordance with the invention.

In accordance with FIG. 1, a spindle 2 which is to be supported is radially and axially guided in a housing 1 by means of two conical bearing slide surfaces 3 in hydrostatic plain bearings. Between the bearing slide surfaces 3, the central portion 4 of the spindle has the largest possible diameter in order to increase the stiffness and rigidity of the spindle. The conical bearing slide surfaces 3 of the spindle 2 rest on corresponding tapered bearing boxes, each of which is composed, in the embodiment shown by way of example, of four segments 5 (see FIG. 2). Each of these segments 5 is provided with an oil pocket 6 supplied with oil under pressure through feed bore holes 7 from a hydraulic source (not shown). The pressure in the lubricating oil pockets is 40 to 120 atm.ga., depending on the size of the bearing. The bearing box segments of the front spindle bearing are clamped by a lid 8 in the housing 1 and form the fixed bearing. The bearing box segments of the rear spindle bearing are seated in a ring 9 which is axially displaceable in the housing 1.

Figure 2:
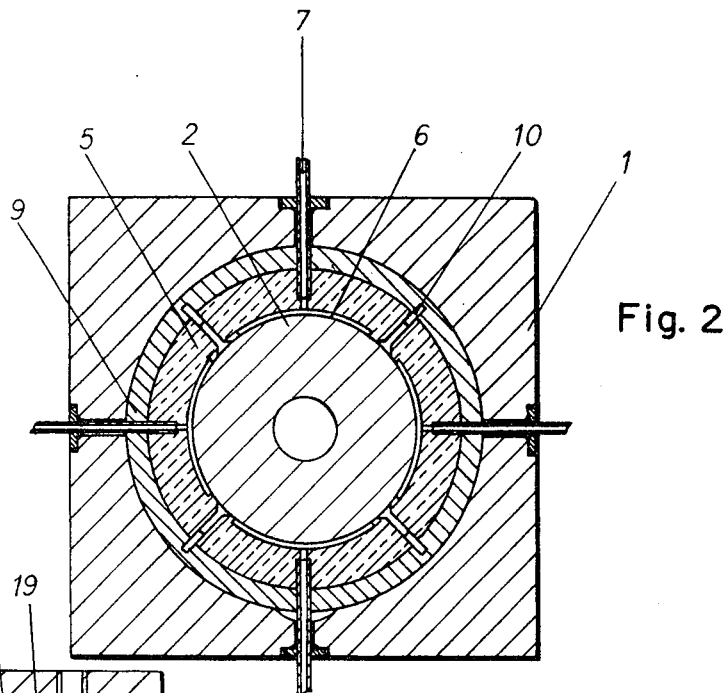
FIG. 2 is a section along the line 2—2 of FIG. 1.

FIG. 2 shows pins 10 which are provided to secure the bearing box segments 5 against rotation and fix the distance between the segments.

Figure 3:
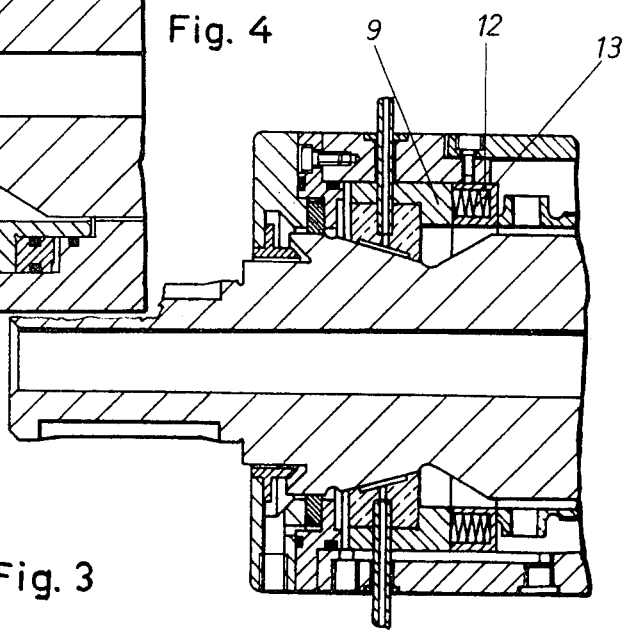
FIG. 3 is a partial axial section through a spindle mounting having a clamping device different from that of FIG. 1.

The clamping device of the invention for the automatic axial readjustment of the bearing box segments of the rear spindle bearing consists, in accordance with FIG. 1, of a plate spring 11 and, in accordance with FIG. 3, of coil springs 13 which are distributed over the periphery of a grooved intermediate ring 12. Each of these springs rests against a front side of the axialy displaceable ring 9. For adjusting and changing the initial tension of the spring elements there is an adjusting sleeve 14 provided with external threads and which rests in a fixed threaded ring 15 of the housing 1 and presses against the different spring elements. The housing 1 has a lid 17 on a top portion giving access to sleeve 14 for the adjustment thereof. The oil of reduced pressure emerging from the lubricating oil pockets 6 through the lubricating slots is fed back via bore holes 16 to the hydraulic pressure-oil supply unit.

Figure 4:
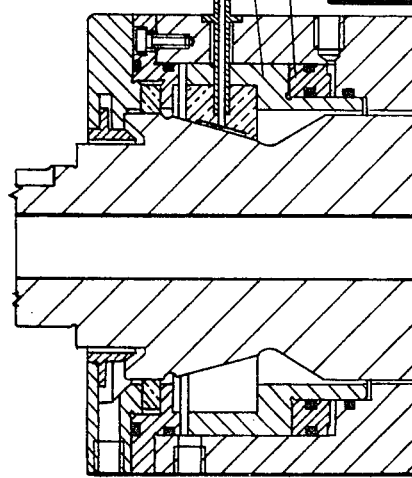
FIG. 4 is a partial axial section through a spindle mounting having a still different clamping device.

In FIG. 4, the clamping is effected with the aid of means other than the plate spring 11 of FIG. 1 or the coil spring 13 of FIG. 3, viz., with the aid of the ring part 18 actuated by the piston 19 moving to the left under the pressure of oil from a conventional hydraulic source (not shown).

The invention may be embodied in other specific forms without departing from the spirit or essential characteristics thereof. The present embodiment is therefore to be considered in all respects as illustrative and not restrictive, the scope of the invention being indicated by the appended claims rather than the foregoing description, and all changes which come within the meaning and range of equivalency of the claims are therefore to be embraced therein.

We claim:

1. A spindle support with hydrostatic plain bearings, particularly for work spindles of machine tools, consisting essentially of front and rear conical bearing slide surfaces of a rotating spindle to be supported by which it is radially and axially supported on correspondingly front and rear conical bearing shells which are fixed against rotation and provided with lubricating oil pockets, and wherein the spindle has two conical bearing slide surfaces symmetrical to a plane perpendicular to the spindle axis, said surfaces tapering towards each other, and each of the bearing shells consisting of at least three segments of the same taper, each of the segments being provided with a lubricating oil pocket, said segments of said front shell being clamped fast at the front spindle bearing within a housing and the rear bearing shell being pressed in axially displaceable manner by a prestressed clamping device supported on the housing against the rear conical bearing slide surface of the spindle.

2. A spindle support according to claim 1, wherein the clamping device consists essentially of a plurality of hydraulically actuated piston/cylinder units distributed over the circumference of the spindle.

3. A spindle support according to claim 1, wherein for the adjustment and change of the initial tension of the clamping device there is provided an externally threaded adjusting sleeve which rests in a fixed threaded ring of the housing and presses against spring elements comprising the prestressed clamping device.

* * * * *